(12) United States Patent
Rosenbauer et al.

(10) Patent No.: US 11,419,476 B2
(45) Date of Patent: Aug. 23, 2022

(54) CONTROL OF A HOUSEHOLD APPLIANCE

(71) Applicant: BSH HAUSGERAETE GMBH, Munich (DE)

(72) Inventors: Michael Georg Rosenbauer, Reimlingen (DE); Volker Thaens, Munich (DE); Sebastian Von Kummer, Iffeldorf (DE)

(73) Assignee: BSH Hausgeraete GmbH, Munich (DE)

( * ) Notice: Subject to any disclaimer, the term of this patent is extended or adjusted under 35 U.S.C. 154(b) by 69 days.

(21) Appl. No.: 16/756,900

(22) PCT Filed: Oct. 12, 2018

(86) PCT No.: PCT/EP2018/077935
§ 371 (c)(1),
(2) Date: Apr. 17, 2020

(87) PCT Pub. No.: WO2019/081234
PCT Pub. Date: May 2, 2019

(65) Prior Publication Data
US 2021/0198828 A1 Jul. 1, 2021

(30) Foreign Application Priority Data
Oct. 26, 2017 (DE) .................. 10 2017 219 260

(51) Int. Cl.
*D06F 33/00* (2020.01)
*A47L 15/00* (2006.01)
*D06F 33/32* (2020.01)
*H04L 12/28* (2006.01)
*D06F 103/04* (2020.01)
*D06F 103/06* (2020.01)
*D06F 105/00* (2020.01)

(52) U.S. Cl.
CPC .......... *A47L 15/0063* (2013.01); *D06F 33/32* (2020.02); *H04L 12/2816* (2013.01);
(Continued)

(58) Field of Classification Search
CPC ............... A47L 15/0063; A47L 15/006; A47L 2401/34; H04L 12/2816; H04L 12/2818;
(Continued)

(56) References Cited

U.S. PATENT DOCUMENTS 7,110,836 B2   9/2006 Sturm et al.
7,927,427 B2   4/2011 Classen et al.
(Continued)

FOREIGN PATENT DOCUMENTS

DE         10340627 A1   4/2005
DE       102008036943 A1   8/2009
(Continued)

OTHER PUBLICATIONS

Jacky Bourgeois et al. "Conversations with my washing machine", Pervasive and Ubiquitous Computing, ACM, 2 Penn Plaza, Suite 701 New York NY 10121-0701 USA, Sep. 13, 2014 (Sep. 13, 2014), pp. 459-470, DOI: 10.1145/2632048.2632106, ISBN: 978-1-4503-2968-2. XP058054639.

*Primary Examiner* — Charles R Kasenge
(74) *Attorney, Agent, or Firm* — Laurence A. Greenberg; Werner H. Stemer; Ralph E. Locher

(57) ABSTRACT

A method for controlling a domestic appliance includes the following steps: determining conventional operating parameters when the domestic appliance is in operation; determining a correlation of the operating parameters with respect to external information; and determining a proposal for operating the domestic appliance with the modified operating parameters if the external information deviates from a conventional value.

13 Claims, 2 Drawing Sheets

(52) U.S. Cl.
CPC ...... *D06F 2103/04* (2020.02); *D06F 2103/06* (2020.02); *D06F 2105/00* (2020.02); *H04L 12/2818* (2013.01); *H04L 12/2823* (2013.01); *H04L 12/2827* (2013.01); *H04L 12/2829* (2013.01)

(58) Field of Classification Search
CPC ............. H04L 12/2829; H04L 12/2823; H04L 12/2827; D06F 33/32; D06F 2103/04; D06F 2103/06; D06F 2105/00
See application file for complete search history.

(56) References Cited

U.S. PATENT DOCUMENTS

| | | | |
|---|---|---|---|
| 2011/0209729 A1* | 9/2011 | Beaudet | A47L 15/0049 134/18 |
| 2012/0066168 A1* | 3/2012 | Fadell | H04L 12/2823 706/52 |
| 2012/0138092 A1 | 6/2012 | Ashrafzadeh et al. | |
| 2013/0297555 A1* | 11/2013 | Fadell | H04L 12/282 706/52 |
| 2015/0006463 A1* | 1/2015 | Fadell | H04L 12/282 706/52 |
| 2017/0172371 A1* | 6/2017 | Engesser | A47L 15/4282 |
| 2017/0234562 A1* | 8/2017 | Ribbich | G05D 23/1923 700/277 |
| 2018/0313564 A1* | 11/2018 | Gavin | G06F 15/76 |
| 2019/0104989 A1* | 4/2019 | Breaux | A61B 5/0537 |
| 2019/0361412 A1* | 11/2019 | Park | G06N 5/043 |

FOREIGN PATENT DOCUMENTS

| | | |
|---|---|---|
| DE | 202014009244 U1 | 3/2015 |
| DE | 102014217615 A1 | 3/2016 |
| WO | 2013021330 A1 | 2/2013 |

* cited by examiner

CONTROL OF A HOUSEHOLD APPLIANCE

BACKGROUND OF THE INVENTION

Field of the Invention

The invention relates to a household appliance. In particular, the invention relates to the intelligent control of a household appliance.

A household appliance, for instance a dishwasher, a washing machine or a tumble dryer, is permanently assigned to a household. One or more people who control and use functions of the household appliance live in the household. In this regard many usages follow a specific routine, for instance a dishwasher can regularly run overnight or the tumble dryer can regularly be used to dry laundry which has previously been washed in the washing machine.

U.S. Pat. No. 7,927,427 A describes a dishwasher, in the interior of which a camera for identifying dishes is installed. A cleaning process of the dishes can then be controlled as a function of the specific dishes.

US 2012/138092 A1 proposes a camera on a dishwasher, in order to identify, when a basket is moved in or out, the points in the interior space at which dishes to be cleaned are located.

SUMMARY OF THE INVENTION

An object underlying the present invention is to determine an improved method in order to control a household appliance. The invention achieves this object by means of the subject matters of the independent claims. Subclaims reproduce preferred embodiments.

An inventive method for controlling a household appliance comprises steps for determining typical operating parameters during an operational cycle of the household appliance; for determining a correlation between the operating parameters and external information; and determining a suggestion to operate the household appliance with modified operating parameters, if the external information deviates from a typical value.

By correlating operating parameters with external information, it is possible to determine in an improved manner which information has an influence on the choice of specific operating parameters. For instance, it can be easily detected that on weekdays a dishwasher is operated at different times and/or with a different operating program than on a weekend. Habits, routines or procedures in the household can be identified or learnt in an improved manner. As a result, it is possible to distinguish, in an improved manner, whether a user intends to deviate from a routine or has forgotten, for instance, to take external information into account when the household appliance is controlled. A suggestion for recording an interrupted routine can be determined, as can a suggestion to alter a current routine. The specific suggestion can fit in better with a user's living circumstances. The user is able to accept the suggestion more frequently and feel more supported by the suggestions.

Determining typical operating parameters can comprise a longer lasting observation of operational cycles, in order to determine a cycle, a rhythm or a causality. For instance, an operational cycle of a dishwasher may typically take place at the same time every evening from Monday to Friday. If a start signal for the operational cycle is absent on a Monday, a suggestion in the form of a reminder to start can only then be output if there is no public holiday on the following Tuesday. Other external information may modify this decision.

The household appliance can be installed in particular in a kitchen of the household and comprise, for instance, a washing machine, a tumble dryer, an autonomous vacuum cleaner or particularly preferably a dishwasher. Operating parameters can comprise, for instance, a work program, an adjustable parameter, for instance a treatment temperature, an additional option or a start or end time of an operational cycle. The household appliance is typically operated by a predetermined operational cycle being started and carried out. A designated task of a user may be required between individual operational cycles, for instance the removal of a first load and the loading of a second. The household appliance can also be switched on permanently or intermittently between individual operational cycles and optionally carry out instructions.

In one embodiment, a user of the household appliance is also determined, wherein the external information relates to the user. By observing information relating specifically to the user, the suggestion can be determined in an improved manner individually for this user. Different users in the same household can be provided with different suggestions which are adjusted to the individual users in an improved manner.

The external information can in particular be taken from a diary of the user. The diary can provide information about a short-term or medium-term life plan of the user, so that a task which the household appliance is to fulfil can be carried out in an improved manner so that the user is supported optimally. For instance, a cleaning cycle can be planned so that filled, unclean material does not dry up for long before it is cleaned, or the cleaning cycle can be planned so that already clean and still damp material is not left standing for a long time before the user or another user in the household returns. The latter embodiment may be important for laundry, for instance, which is not to remain damp for a long time after a wash cycle, in order to avoid mould stains.

The external information can relate to the presence of a further person in a, in which the household appliance is installed. Therefore a cleaning frequency of a cleaning household appliance can be increased, for instance, if more people than typical are residing in the household. Cleaning times can be determined in an improved manner on the basis of the presence of people. The type of person can also be taken into account: if a small child is visiting, rest periods during which the small child is sleeping and the household appliance is preferably not running are possibly to be observed, or hygiene requirements, which form the basis of an operational cycle, can be adjusted. A washing temperature of a washing machine or a dishwasher can be increased, for instance. A program duration can be reduced in order to support procedures in the household in an improved and flexible manner. It is also possible to take individual persons and external information linked thereto into account.

A correlation between the operating parameters and an appliance parameter can be determined, wherein the suggestion is determined as a function of a current appliance parameter. An appliance parameter influences an operational cycle of the household appliance and is not controlled by a user. Appliance parameters can comprise, for instance, a quality of a detergent, a water hardness of the water used, a type or quantity of contamination of an object to be cleaned and in particular a type or quantity of a loading of the household appliance with objects to be treated. In other words, the household appliance can make the suggestion as a function of distinct expert knowledge relating to an impending operational cycle. The suggestion can thus be adjusted to a typical or habitual operational cycle in the household in an improved manner.

The external information can also relate to an operating or appliance parameter of another household appliance in a household in which the household appliance is installed. For instance, the type and quantity of laundry filled in a washing machine can also influence an impending operational cycle of a tumble dryer. Use of a cooker may anticipate that a dishwasher must soon clean dishes. Networked objects and in particular other networked household appliances can thus contribute information for determining the suggestion in an improved manner. In general with an improved information situation at least in the long term, after several observed cycles, a suggestion for a changed operational cycle of the household appliance which fits better into a routine or a life of one or more users of a household appliance is possible. In one embodiment, the suggestion can also be implemented by the household appliance. Acceptance of a changed parameterization by a user can also be obtained.

The suggestion can relate to a first operational cycle of the household appliance and be determined so that a subsequent second operational cycle of the household appliance with typical operating parameters is permitted. If it is known, for instance, that a routine operational cycle of a dishwasher is impending in the evening, for instance, but at the same time around midday the dishwasher is already half full, it may be suggested to carry out an additional operational cycle in the afternoon in order to create space for the evening's load. The operational cycle can be planned so that it is already finished when the dinner is prepared so that all kitchen utensils are already available.

In some embodiments, a user can select the external information, the correlation of which with operating parameters is to be taken into account. Both the addition of external information ("opt-in") and also the removal of considered external information ("opt-out") is conceivable.

The correlation can be determined by means of a Bayesian filter. This can essentially ensue, as with a known spam filter for e-mail, by suggestions being made to the user, who accepts or rejects them and thereupon determines which external information correlates with an acceptance or a rejection. The significance of the external information can thus be learnt quickly and reliably. A Bayesian filter can already achieve good suggestions without training or with very little training. The filter performance can be further improved on the basis of user feedback notifications with respect to accepted or rejected suggestions during ongoing operation. A distinction between training operation and implementation operation is not necessary.

In another embodiment, the correlation can be determined by means of a neural network. Here a significant amount of external information from a number of determinations can be taken into account. In particular, suggestions and their acceptance from other households can be used for training the neural network. In a subsequent implementation operation, the network can intelligently determine very good suggestions.

An inventive household appliance comprises a control apparatus for controlling the household appliance with predetermined operating parameters. Here the control apparatus is designed to determine typical operating parameters of the household appliance; to determine a correlation of the operating parameters with external information; and to determine a suggestion to operate the household appliance with modified operating parameters, if the external information deviates from a typical value.

The control apparatus can comprise a processing facility, which can be embodied in particular as a programmable microcomputer or microprocessor. The processing facility is preferably designed to implement a method described herein in its entirety or in parts. In particular, the processing facility can be designed to form a Bayesian filter or a neural network. The method can exist in the form of a computer program product with program code means and run on the processing facility or be stored on a computer-readable data carrier. Features or advantages of the control apparatus can be transferred to the method and vice versa.

BRIEF DESCRIPTION OF THE SEVERAL VIEWS OF THE DRAWING

The invention is now described in more detail with reference to the attached figures, in which.

DETAILED DESCRIPTION OF THE INVENTION

Figure 1:
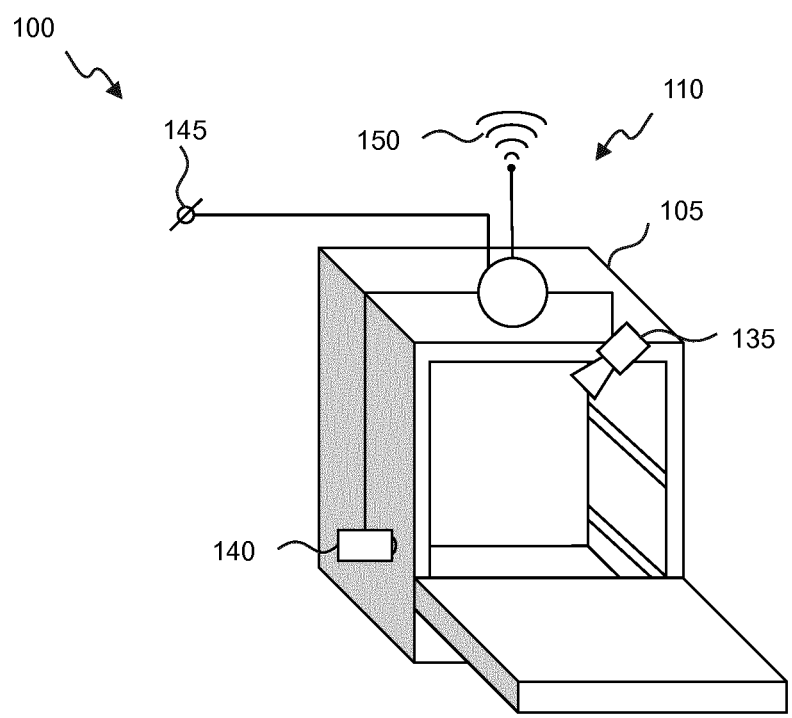
FIG. 1 shows a system with an exemplary household appliance.
Figure 1:
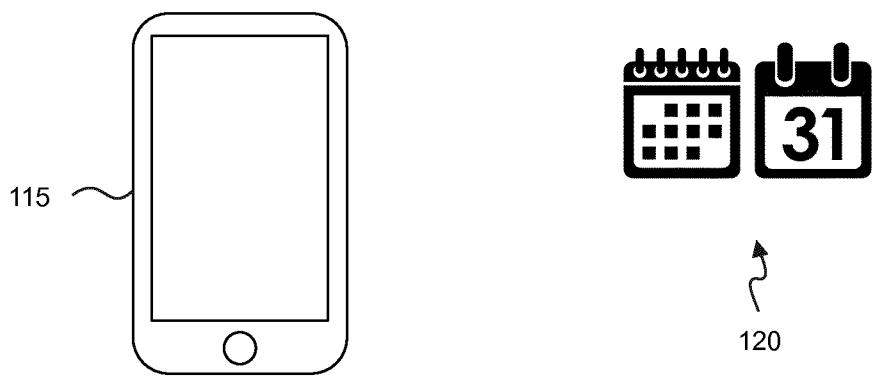

FIG. 1 shows a system 100 which comprises a household appliance 105 with a control apparatus 110. Optionally a mobile appliance 115 and/or a diary 120 can also be included in the system 100. The control apparatus 110 comprises a processing facility 125, which preferably comprises a programmable microcomputer or microcontroller. Some of the instructions described below can also be performed by another processing facility instead of by the processing facility 125, in particular a facility which can be reached via the network, for instance a server or a service, in particular in a cloud. The household appliance 105 is shown as a dishwasher, but, in another embodiment, can also comprise another appliance, which is installed in a household appliance 130, for instance a washing machine, a tumble dryer or an autonomous vacuum cleaner. The household appliance 105 is preferably designed to clean objects in the household 130.

The control apparatus 110 is designed to detect one or more operating parameters of the household appliance 105. For this purpose, the processing facility 125 can be connected to one or more sensors. In the exemplary embodiment shown, a camera 135 for optically sampling an interior of the dishwasher shown and a liquor sensor 140 for analyzing a circulated washing water (liquor) are provided as sensors. Other or additional sensors are likewise possible. An interface 140 is optionally provided, which can lead to an input/output facility for a user, another household appliance 105 or another sensor in the household 130. In addition or alternatively, a wireless interface 150 can be provided. A connection to a network such as a mobile radio network, a WLAN network or the Internet can be established by way of one of the interfaces 145, 150.

The mobile appliance 115 which can be assigned to a user of the household appliance 105 can be reached by way of such a network. The user preferably lives in the household 130 or is at least present there regularly. Provision can also be made for a number of users who live in the household 130, wherein a mobile appliance 115 can be assigned to each user. Furthermore, further people, for instance visitors or guests, may temporarily reside in the household 130. The user can be identified by way of the mobile appliance 115 or an item of external information relating thereto can be determined. Further external information can be obtained by way of sensors 135, 140 or the interfaces 145, 150. All information which does not relate directly to the operation of the household appliance 105 can be considered as external.

The mobile appliance 115 can enable the diary 120 or enable access to a separate diary 120. The diary 120 can also be reached directly, for instance by way of one of the described networks, from the control apparatus 110. The diary 120 can be realized as a service, for instance in a cloud. The diary 120 preferably comprises appointments for the user, from which, for instance, a planned presence or absence of the user in the household 130, a typical daily routine, an impending visit or guest in the household 130 or other information can be derived, which can directly or indirectly affect an operation of the household appliance 105.

It is suggested that the control apparatus 110 be designed to observe operating parameters forming the basis of the operational cycles during one or more operational cycles. The operating parameters can be correlated with external information and on the basis of a deviation of an operating parameter, for instance a time instant for a start of an operational cycle, from a typical value, a suggestion for operating the household appliance 105 with modified operating parameters can be determined and output. If a specific operating cycle is determined, for instance, such as an operational cycle every 24 hours, a suggestion can be made to maintain the cycle if a control of an operational cycle is untypically absent. Conversely, on the basis of an external item of information a suggestion can also be determined to change a specific cycle or deviate therefrom.

Figure 2:
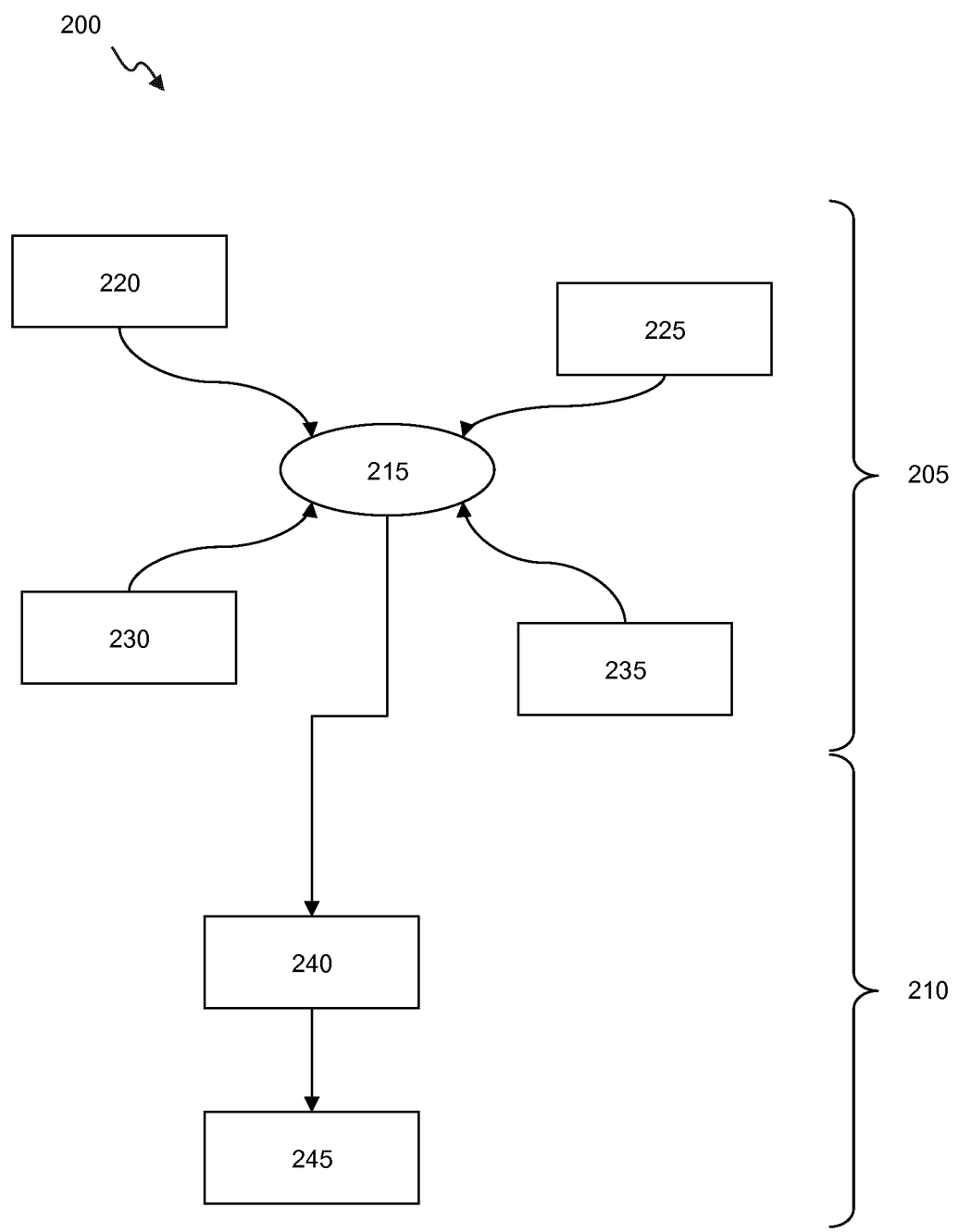
FIG. 2 shows a flow chart of an exemplary method for controlling a household appliance.

FIG. 2 shows a flow chart of a method 200 for controlling a household appliance such as the household appliance 105 of the system 100 shown in FIG. 1. In one embodiment, the method 200 can be divided into a learning or training phase 205 and an implementation phase 210, for instance if it is realized by means of a neural network. In other embodiments, both phases 205, 210 can be run through at the same time, for instance if it is carried out by means of a Bayesian filter.

In one step 215, operating parameters are determined in one or preferably more operational cycles of the household appliance 105. The more frequently specific operating parameters are used jointly, the "more typical" therefore these operating parameters may be. Moreover, a correlation is determined between the operating parameters and one or more items of external information. The external information can be summarized as boundary conditions, so that it is possible to determine the boundary conditions under which the operating parameters are probable.

The external information can be determined in one step 220 by a mobile appliance 115 of a user, for instance. A great deal of information, which determines a daily routine of the user, can be determined by way of the mobile appliance, in particular appointments from the diary 120. Furthermore, external information can be determined in one step 225 in the form of appliance parameters of the household appliance 105. For instance, it can be determined that a specific type of treatment, for instance cleaning, of objects by means of the household appliance 105 can be correlated with a recurring event, which can be determined from the diary 120 for instance.

In a step 230, appliance parameters of another household appliance 105 can be determined. The other household appliance can be designed for instance to process the same objects but by means of another work step. In this way, operational cycles of the two household appliances 105 can correlate with one another or be connected causally.

In a step 230, a user who communicates with the household appliance 105 or with whom the household appliance 105 communicates can be determined. In one embodiment, the user who engages in dialog with the household appliance 105 is determined. In another embodiment, the control apparatus 110 itself determines the user within the household 130 to whom it makes a suggestion to operate the household appliance 105, for instance. This may be a designated person, a present person or the person or has repeatedly attended to the household appliance 105 during a predetermined period of time. The user can be identified by inputs, for instance, using a biometric sensor or by way of the mobile appliance 120. To this end, a mobile radio technology with just minimal range can be used between the household appliance 105 and the mobile appliance 115, so that a further remote mobile appliance is not detected.

The knowledge from the first phase 205 can be used in the second phase 210. In particular, in a step 240 it is possible to determine that a combination of external information deviates from a set combination of appliance parameters which is typically correlated therewith. In other words, it is possible to determine that known boundary conditions are not observed by a user, or new boundary conditions apply, which result in a new desired combination of operating parameters. In a step 245, a suggestion can therefore be made to determine the way in which the household appliance can be operated.

In a first example, it was determined in the first phase 205 that on a Sunday evening food is regularly cooked for a number of people in the household 130. Used dishes are then cleaned in a dishwasher 105 so that they are clean again on Monday morning. On Sunday the control apparatus 110 may already suggest after breakfast to start a cleaning cycle in order to have sufficient processing capacity for the dishes from the evening meal.

In a second example, the dishwasher 105 is able to determine from the diary 120 when a user is going shopping. If supplies of consumables for the dishwasher are running low, for instance a detergent or regenerating salt, the user can promptly be reminded of a corresponding purchase.

In a third example, a delayed start of an operational cycle of a dishwasher can be suggested, if it is known when the dishwasher is to be emptied. If the time between filling and emptying the dishwasher is long, an energy-saving program with a longer duration can also be recommended to the user.

In a fourth example, a visit from a particular person, for instance a mother-in-law of the user, can be taken from the diary 120. A prompt operational cycle, in particular a cycle which is preferred to a typical cycle, can be suggested for the cycle of a dishwasher 105.

In a fifth example, due to a user being away from the household 130 for a longer period of time, which is determined from the diary 120, it can be suggested to start an operational cycle early so that it is ended before the person leaves and the user is still able to remove the dishes.

In a sixth example, it is possible to determine on the basis of movement, payment or purchasing information from the mobile appliance 115 that the user has purchased medicine for an infectious disease. In a subsequent operational cycle of a dishwasher 105, the wash temperature can be raised or an additional hygiene option can be activated.

REFERENCE CHARACTERS 100 system
105 household appliance
110 control apparatus 115 mobile appliance
120 diary
125 processing facility
130 household
135 camera
140 liquor sensor
145 interface
150 wireless interface
200 method
205 first phase
210 second phase
215 determine typical operating parameters
220 determine external information from mobile appliance
225 determine appliance parameters
23 determine appliance parameters of another household appliance
235 determine user
240 determine deviation in parameters
245 determine suggestion

The invention claimed is:

1. A method of controlling a dishwashing appliance, the method comprising the following steps:
    providing a control apparatus, at least one sensor, and a user interface; the control apparatus being configured to define at least one operating parameter of the dishwashing appliance using the sensor;
    defining typical operating parameters of the dishwashing appliance during an operational cycle;
    determining a correlation between the operating parameters and an external item of information, the external information relating to an appliance parameter of another household appliance in the household;
    determining a correlation between the operating parameters and an appliance parameter and determining a suggestion as a function of a current appliance parameter, wherein the appliance parameter comprises a type or quantity of a loading of the dishwashing-appliance with objects to be treated; and
    if the external item of information deviates from a typical value, determining the suggestion to operate the dishwashing appliance with modified operating parameters; and
    displaying the suggestion for controlling the dishwashing appliance via the user interface.

2. The method according to claim 1, which comprises determining a user of the dishwashing appliance and relating the external information to the user.

3. The method according to claim 2, which comprises taking the external information from a calendar of the user.

4. The method according to claim 1, wherein the external information relates to the presence of an additional person in a household.

5. The method according to claim 1, wherein the suggestion relates to a first operational cycle of the dishwashing appliance and the suggestion is determined so that a subsequent second operational cycle of the dishwashing appliance according to typical operational parameters is enabled.

6. The method according to claim 1, which comprises determining the correlation by way of a Bayesian filter.

7. The method according to claim 1, which comprises determining the correlation by a neural network.

8. A dishwashing appliance, comprising:
    a control apparatus for controlling the dishwashing appliance according to predetermined operating parameters;
    at least one sensor; and
    a user interface;
    said control apparatus being configured to:
        determine typical operating parameters, via said at least one sensor, during an operational cycle of the dishwashing appliance;
        determine a correlation between the operating parameters and an external item of information, the external information relating to an appliance parameter of another household appliance in the household;
        determine a correlation between the operating parameters and an appliance parameter and determine a suggestion as a function of a current appliance parameter, wherein the appliance parameter comprising a type or quantity of a loading of the dishwashing appliance with objects to be treated; and
        determine, and display via said user interface, the suggestion to operate the dishwashing appliance with modified operating parameters if the external information deviates from a typical value.

9. A method of controlling a dishwashing appliance, the method comprising the following steps:
    providing a control apparatus, at least one sensor, and a user interface; the control apparatus being configured to define at least one operating parameter of the dishwashing appliance using the sensor;
    defining typical operating parameters of the dishwashing-appliance during an operational cycle;
    determining a correlation between the operating parameters and an external item of information;
    determining a user of the dishwashing appliance and relating the external information to the user and taking the external information from a calendar of the user;
    determining a correlation between the operating parameters and an appliance parameter and determining a suggestion as a function of a current appliance parameter, wherein the appliance parameter comprises a type or quantity of a loading of the dishwashing-appliance with objects to be treated; and
    if the external item of information deviates from a typical value, determining the suggestion to operate the dishwashing appliance with modified operating parameters; and
    displaying the suggestion for controlling the dishwashing appliance via the user interface.

10. The method according to claim 9, wherein the external information relates to an appliance parameter of another household appliance in the household.

11. The method according to claim 9, wherein the suggestion relates to a first operational cycle of the dishwashing appliance and the suggestion is determined so that a subsequent second operational cycle of the dishwashing appliance according to typical operational parameters is enabled.

12. The method according to claim 9, which comprises determining the correlation by way of a Bayesian filter.

13. The method according to claim 9, which comprises determining the correlation by a neural network.

* * * * *